United States Patent
Reidelbach

(10) Patent No.: US 12,138,572 B2
(45) Date of Patent: Nov. 12, 2024

(54) LIQUID SEPARATOR

(71) Applicant: Umfotec Acoustic Solutions GmbH, Northeim (DE)

(72) Inventor: Marco Reidelbach, Hann. Muenden (DE)

(73) Assignee: UMFOTEC ACOUSTIC SOLUTIONS GmbH, Northeim (DE)

( * ) Notice: Subject to any disclaimer, the term of this patent is extended or adjusted under 35 U.S.C. 154(b) by 0 days.

(21) Appl. No.: 18/108,184

(22) Filed: Feb. 10, 2023

(65) Prior Publication Data

US 2023/0256374 A1 Aug. 17, 2023

(30) Foreign Application Priority Data

Feb. 11, 2022 (DE) ...................... 10 2022 103 266.3

(51) Int. Cl.
| | |
|---|---|
| *B01D 46/42* | (2006.01) |
| *B01D 46/00* | (2022.01) |
| *B01D 45/04* | (2006.01) |

(52) U.S. Cl.
CPC ..... *B01D 46/4236* (2013.01); *B01D 46/0031* (2013.01); *B01D 45/04* (2013.01)

(58) Field of Classification Search
CPC . B01D 46/4236; B01D 46/0031; B01D 1/305
USPC .............. 96/381, 234, 236; 55/456
See application file for complete search history.

(56) References Cited

U.S. PATENT DOCUMENTS

| | | | |
|---|---|---|---|
| 6,915,814 B2 * | 7/2005 | Cheng | E03C 1/126 137/546 |
| 10,403,256 B2 | 9/2019 | Denker et al. | |
| 10,450,911 B2 | 10/2019 | Doering | |
| 2017/0316771 A1 * | 11/2017 | Denker | F02M 21/0206 |

FOREIGN PATENT DOCUMENTS

| | | |
|---|---|---|
| DE | 150783 | 9/1981 |
| DE | 102005038891 | 2/2007 |
| DE | 102005038896 | 3/2007 |

OTHER PUBLICATIONS

German Office Action dated Oct. 4, 2022.

* cited by examiner

*Primary Examiner* — Robert A Hopkins
*Assistant Examiner* — Qianping He
(74) *Attorney, Agent, or Firm* — Gerard E Hespos; Michael J Porco

(57) ABSTRACT

A liquid separator (10) has a horizontal main pipe (100) and a collecting basin (200) arranged sealingly on the underside of the main pipe (100). A partition wall (310) extends transverse to the main pipe (100) and divides the collecting basin (200) into first and second basin chambers (210, 220). The first basin chamber (210) is connected to the interior of the main pipe (100) via passage openings (320), and the second basin chamber (220) has an outlet opening (230). The partition wall (310) extends sealingly on the underside of the main pipe across the width of the collecting basin (200) and has a connecting opening interconnecting the first and second basin chambers (210, 220) in a fluid-conducting manner. The second basin chamber (220) has no direct connection to the interior of the main pipe (100) and the outlet opening is higher than an upper edge of the connection opening.

10 Claims, 2 Drawing Sheets

LIQUID SEPARATOR

BACKGROUND

Field of Invention

The invention relates to a liquid separator.

Related Art

DD 150 783A discloses a liquid separator that that includes a main pipe and a collecting basin. The main pipe has a pipe axis that is oriented horizontally. The collecting basin has basin walls arranged sealingly on the underside of the main pipe and a partition wall aligned transverse to the axial direction of the main pipe. The partition wall divides the collecting basin into first and second basin chambers. The first basin chamber connects to the interior of the main pipe via passage openings, and the second basin chamber has an outlet with an outlet opening. The partition wall extends sealingly on the underside of the main pipe across the width of the collecting basin and has a connecting opening interconnecting the first and second basin chambers in a fluid-conducting manner.

Many technical fields face problems of cleaning a gas flow from entrained liquid and also reducing a sound level generated in the system. The above-referenced DD 150 783A discloses a sound-absorbing liquid separator as a combination device, and mentions the output flow of rotary compressors as a typical field of application. Such rotary compressors could find use, for example, in compressed air generation devices where oil is used to lubricate the compressor, and the oil must be separated from the generated compressed air. Other applications include compressors in air conditioning systems, where compressed refrigerant must be freed from the oil used to lubricate the compressor. A completely different technical field where sound-reducing liquid separators are desirable is that of exhaust devices in motor vehicles, especially those for removing the exhaust gases of a fuel cell. Comparatively large quantities of water produced by the chemical reaction in the fuel cell must be separated from the exhaust air.

DD 150 783A discloses a horizontal main pipe that serves as a housing for a complex arrangement of various inner pipes and deflects an introduced gas flow in several ways by passing the air through a porous material, such as mineral wool. The mineral wool serves as a sound absorber, in that sound carried in the gas flow is scattered and absorbed by the fibers. The mineral wool also serves as an oil filter, in which oil carried in the gas stream settles on the fibers of the mineral wool and runs down under the force of gravity. The oil then drips through passage openings that penetrate the pipe wall on the underside of the main pipe into a collecting basin attached to the main pipe below it. The bottom of the collecting basin has an outlet for the collected oil. The disclosed outlet is in the form of a pipe socket, and the entry opening of the pipe socket passes through the bottom of the collecting basin. Two mineral wool cushions are spaced axially from each other in the main pipe. Passage openings to the collecting basin are arranged under each mineral wool cushion so that the separated oil drips into the collecting basin in two axially spaced areas of the basin. Fluid can flow through the two cushions in succession along well-defined paths. The collecting basin is divided into two basin chambers by a central partition wall aligned transverse to the axial direction of the main pipe The central partition prevents parts of the gas flow from taking a "shortcut" from the gas flow inlet side cushion through the associated passage openings into the collecting basin and further through the passage openings associated with the second cushion into the collecting basin. However, a hole is provided in the partition wall in the immediate vicinity of the bottom of the collecting basin so that both basin chambers can be emptied via a common outlet. The hole in the partition wall connects both basin chambers to one another in a fluid-conducting manner, so that the oil can flow from the one basin chamber having no outlet into the other basin chamber having an outlet.

A disadvantage of the known device is the considerable pressure loss experienced by the gas flow as it passes through. This pressure loss is due mainly to the frequent deflection and passage of the gas flow through the mineral wool cushions. In many cases, the mineral wool cushions could be made considerably less voluminous with regard to their function as liquid filters. However, sound attenuation attributed to the mineral wool cushions would suffer considerably.

Helmholtz resonators rely upon the destructive superposition of sound waves to reduce sound rather than attenuating sound by scattering and absorption. U.S. Pat. No. 10,403,256 discloses a Helmholtz resonator type of silencer that can reduce sound but does not perform any liquid separator function. The silencer of U.S. Pat. No. 10,403,256 has a main pipe through which the gas flows, and an outer annular chamber completely surrounds the main pipe. The interior of the outer annular chamber is connected to the interior of the main pipe via acoustic slots. Sound enters the annular resonator chamber through the acoustic slots, is reflected by the wall of the outer annular chamber and, if the chamber dimensions are designed correctly, the sound destructively superimposes on itself, resulting in a significant reduction of the sound level exiting at the end of the main pipe. To suppress different frequency bands effectively, the resonance chamber is divided into different subchambers by several ring walls projecting radially outward from the main pipe. The annular walls are not in sealing contact with the outer wall of the resonance chamber; according to the teachings of U.S. Pat. No. 10,403,256. Thus, the remaining annular gap is sealed adequately during operation by local oscillating air masses.

U.S. Pat. No. 10,450,911 discloses a sound-reducing exhaust gas aftertreatment device with a vertically aligned main pipe that laterally adjoins a resonator chamber. The resonator chamber is connected to the interior of the main pipe via a passage opening arranged in its upper region and acts as a Helmholtz resonator for sound reduction. Further, the resonator chamber is connected to a fluid circuit via a valve-controlled inlet and a valve-controlled outlet. The valves enable a fluid level in the resonator chamber to be adjusted. The free volume and thus the natural frequencies of the resonator chamber change depending on the fill level, so that the spectral sound reduction properties of the Helmholtz resonator can be adjusted by the fill level change.

It is an object of the invention to improve a sound-reducing liquid separator in such a way that a lower pressure loss is produced in the gas flow while preserving a comparable effectiveness.

SUMMARY OF THE INVENTION

A liquid separator in accordance with an embodiment of the invention comprises a main pipe having a pipe axis oriented horizontally. A collecting basin has basin walls arranged sealingly on an underside of the main pipe. A partition wall is aligned transverse to the axial direction of the main pipe and divides the collecting basin into first and second basin chambers. The first basin chamber is connected to the interior of the main pipe via passage openings and the second basin chamber has an outlet with an outlet opening. The partition wall extends sealingly on the underside of the main pipe across the width of the collecting basin and has a connecting opening that interconnects the first and second basin chambers in a fluid conducting manner. The second basin chamber has no direct connection to the interior of the main pipe, and the outlet entry opening is located higher than the upper edge of the connection opening.

The liquid separator assigns a double function to the collecting basin, namely as an actual collecting basin and also as a resonator chamber for resonance-based sound reduction. Due to the particular efficiency of lowering the sound level by resonance-based sound reduction, sound-attenuating measures (in the sense of scattering and dissipation) can be dispensed with, even though their supporting use certainly remains possible. This configuration reduces the pressure loss in the gas flow associated with such sound-attenuating measures. However, as has been shown surprisingly, the desired effect cannot be achieved with a direct implementation of this idea. In particular, the outlet for discharging the liquid collected in the collecting basin provides an exit for the sound entering the collecting basin, so that the sound reflection in the collecting basin serving as a resonance chamber is disturbed. Thus, a direct sound path into the system environment is provided. The sound reduction therefore does not reach the desired level when the basic idea of the invention is implemented directly.

Subdivision of a collecting basin into two basin chambers is known in principle from the prior art but is used there for completely different reasons. More particularly the collecting basin disclosed herein has one essential difference from the known art in that one of the basin chambers, namely the chamber referred to as the second basin chamber, is neither effective as a resonance chamber nor does it directly receive separated liquid from the main pipe. Rather, the second basin chamber is a "dead" chamber that indirectly provides a significant increase in sound reduction. The principle of operation is such that liquid separated from the gas flow in the main pipe—for example by means of filter materials used there—runs through the passage openings into the first basin chamber. The liquid is distributed to both basin chambers through the connecting opening in the partition wall. In the process, the liquid level gradually rises as the amount collected increases. In the case of large quantities of liquid, this increase can be rapid. The increase continues until the liquid level reaches the entry opening of the outlet. A further increase of the liquid level is counteracted by discharging the liquid through the outlet. However, due to the defined height ratio of the outlet entry opening and the connecting opening, the connecting opening already is filled completely with liquid at this point. The two basin chambers therefore are air-sound insulated from each other at this point. This means that only the first basin chamber acts as a sound-reducing resonator chamber for sound that enters the first basin chamber through the passage openings. A transfer of sound into the second basin chamber and towards the outlet is not possible due to the air-sound insulating filling of the connecting opening with liquid. Rather, the first basin chamber serves as a single resonator chamber, the (functional) resonator chamber bottom of which is the surface of the collected liquid. Taking into account a liquid resonance chamber bottom, the position of which is determined by that liquid level that is established as soon as the liquid reaches the entry of the outlet, a precise acoustic tuning of the resonance chamber can thus be carried out for the targeted reduction of particularly disturbing sound wave frequency bands. At the same time, no sound can penetrate through the connecting opening into the second basin chamber. The second basin chamber, in turn, has no "own" through-openings to the main pipe. Thus, no sound can penetrate into the second basin chamber and out of the system through the outlet in this way either. The second basin chamber therefore acts acoustically as an insulating sluice chamber through which the collected liquid can pass unhindered to the outlet.

It will be understood by those skilled in the art that the explanation of the invention refers to a liquid separator oriented in the operating position. Outside of operation, of course, any other orientation is conceivable. However, a liquid separator is considered to be in accordance with the invention if it at least can be brought into an orientation described herein and can be operated in this orientation.

The partition of some embodiments has a straight, horizontal lower edge that is spaced from the bottom of the collecting basin. More particularly, a well-defined gap can be formed across the entire width of a collecting basin that has a flat bottom, and the gap serves as a connecting opening. This configuration ensures a largely unhindered exchange of liquid between the basin chambers and a clear definition of the upper edge of the connecting opening. In principle, the connecting opening can be designed differently, for example in the form of a borehole. In this case, the upper edge of the connecting opening would coincide with its upper apex. The position of the outlet opening with this design is determined by the height of its lower edge, which is obvious to the person skilled in the art from the explained functionality. Preferably, this lies a few millimeters above the upper edge of the connection opening.

The main pipe may have a multi-part design in that its pipe wall has a window in the area of the collecting basin. The insert can be closed with an insert supporting the passage openings and the partition wall. This makes it possible to manufacture slightly differently acoustically tuned sound reducers on the basis of the same main pipe and collecting basin shape. Indeed, the acoustic tuning of a sound reducer-resonator depends to a large extent on the volume of the resonator chamber and the shape and size of the passage openings. Different inserts with differently positioned partition walls and/or differently shaped passage openings can therefore be used to create resonators with different acoustic efficiency, while always using the same main pipe and the same collecting basin. The window of the main pipe merely has to be closed with the appropriate insert. This is particularly important in the automotive industry. Here, great efforts are made to standardize technical elements; however, due to different proportions of different models, completely different acoustic boundary conditions may exist. Acoustic adaptation of the liquid separator according to the invention by simply replacing the insert then represents a considerable advantage. In some embodiments, the insert is fixed or can be fixed in the window by means of a simple snap-in connection. Reversibility of the snap-in connection is possible, but not usually necessary.

The main pipe may be composed of an upper half-shell and a lower half-shell that may support the window. The half-shells can be identical in shape with the exception of the through-openings and possibly with the exception of the window. This allows both half shells to be produced in the same mold, and the passage openings or the window can be introduced subsequently easily, for example by punching.

The half-shells of the main pipe can be made of metal or plastic, for example by injection molding or deep drawing or by other means.

As explained above, a core concern of the invention is to make sound reduction particularly effective by applying the resonance principle. However, this does not prevent the use of additional sound reduction measures based on energy dissipation, in particular if no significant pressure loss in the gas flow is associated therewith. For example, in one embodiment, the passage openings are filled with a porous sound-absorbing filter body permeable to gas and liquid. As a result, sound already is reduced by absorption when the sound enters the collecting basin that acts as a resonance chamber. However, this material filling of the passage openings must not excessively impede the inflow of liquid into the collecting basin.

A similar idea is followed by a further development in which the underside of the main pipe within the resonator chamber, the chamber walls and/or the partition wall are provided with a porous, sound-absorbing coating at least in certain areas. In other words, the walls of the resonator chamber accessible to air-sound are sound-absorbing coated to maximize overall sound reduction.

To convey the liquid separation from the gas flow, the part of the main pipe above the passage openings is filled with a porous material that is permeable to gas and liquid. For example, mineral or glass wool, a knitted wire mesh or knitted fabric, or a (metal) foam body can be used here. However, this can be optimized for its properties as a liquid separator. Its (unavoidable) additional function as a silencer is of secondary importance, since the sound reduction takes place primarily in the resonance chamber. Accordingly, this material filling of the main pipe can be designed so that the pressure loss suffered by the gas flow remains as low as possible.

The collecting basin can be molded integrally to or with the underside of the main pipe. Alternatively, the collecting basin can be fixed as a separate component to the underside of the main pipe. It is conceivable to fix the basin component permanently, in particular by material bonding, for example by gluing, soldering or welding, to the main pipe. However, a positive connection is also conceivable, for example by a snap-in connection, which can even be reversible. In any case, one advantage of designing the collecting basin as a separate component is that different acoustic tunings of the system can be made by selecting the basin component without having to modify the main pipe.

Further details and advantages of the invention will be apparent from the following specific description and drawings.

DETAILED DESCRIPTION

Figure 1:
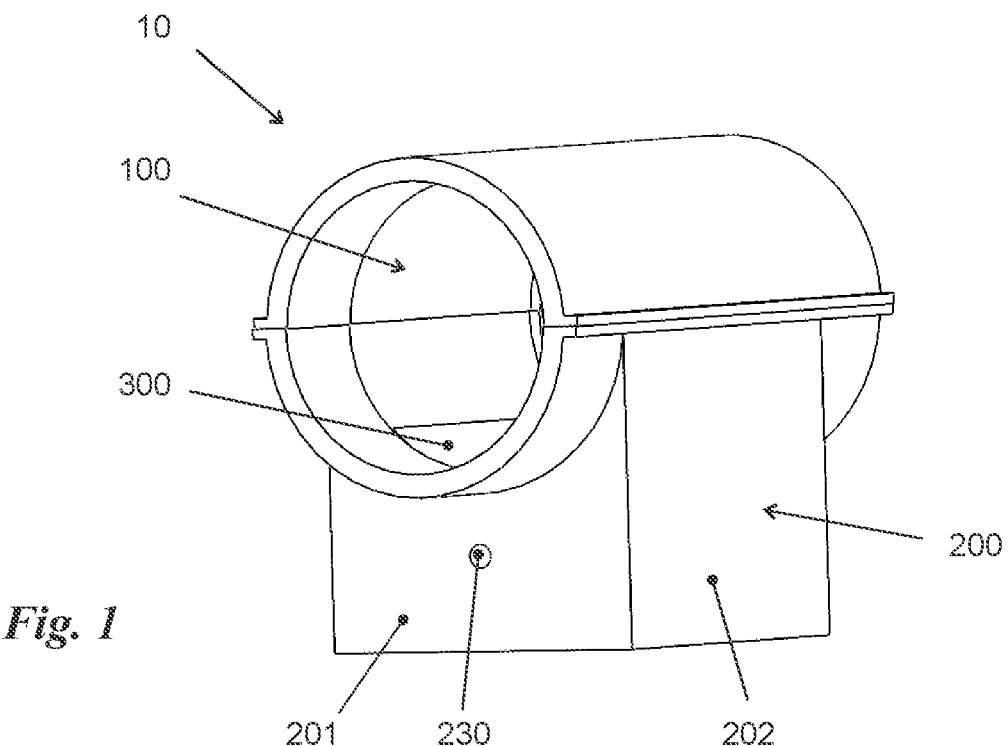
FIG. 1 is a schematic 3D representation of a liquid separator according to a embodiment of the invention
Figure 2:
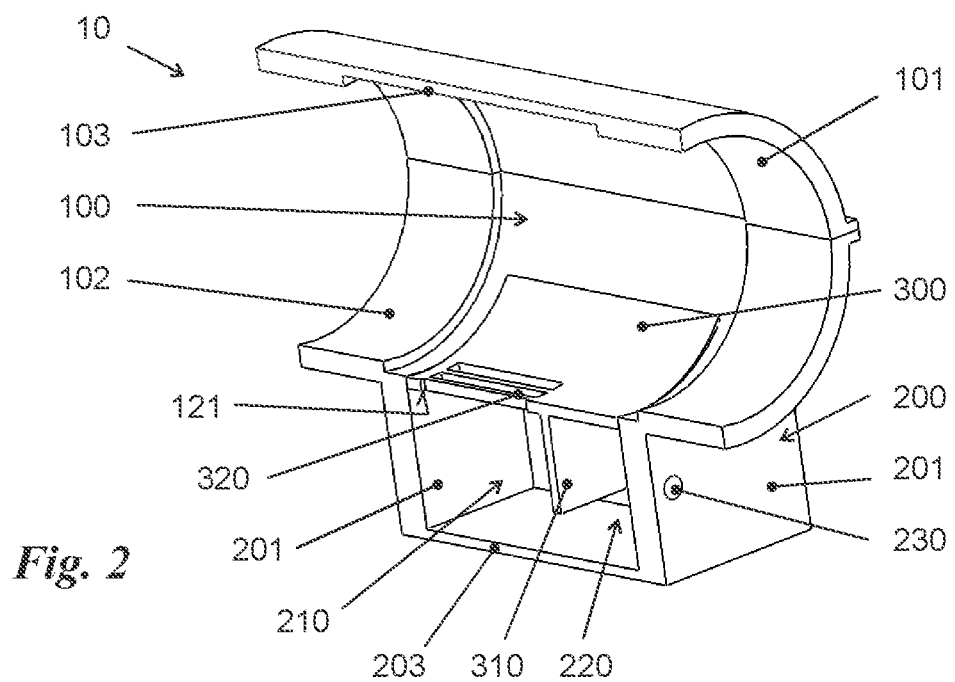
FIG. 2 is a partial cutaway view of the liquid separator of FIG. 1.
Figure 3:
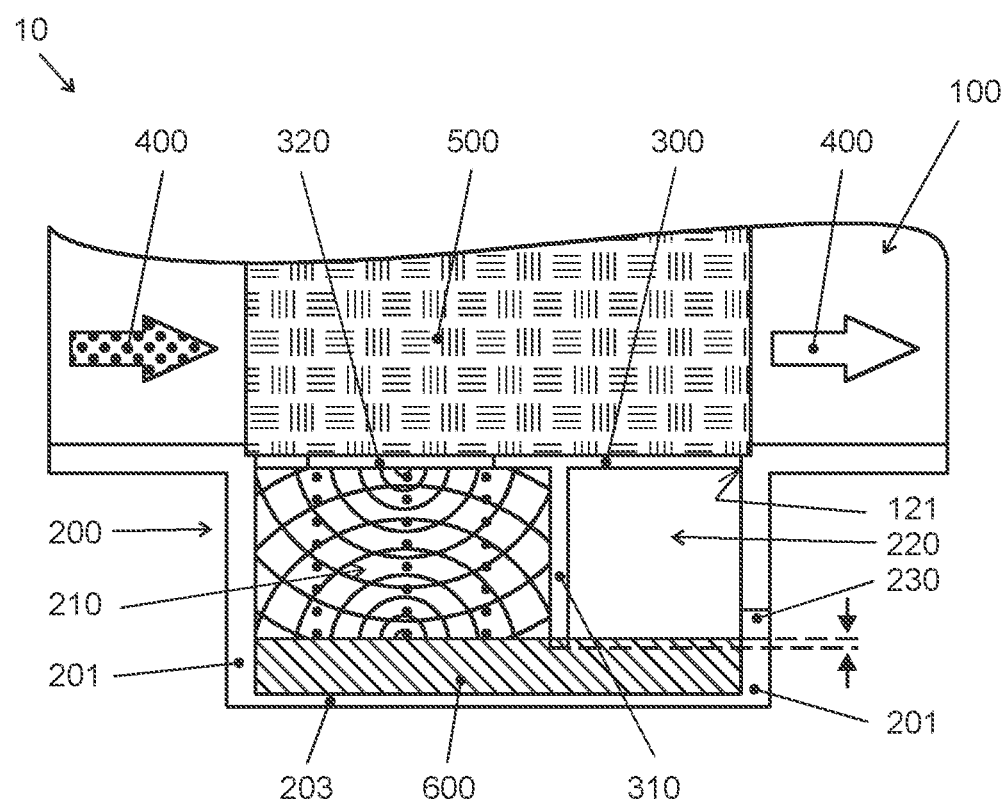
FIG. 3 is an axial cross-section of the basin area of a liquid separator.

FIG. 1 Is a schematic perspective view of a liquid separator 10 according to an embodiment of the invention. FIG. 2 shows the same liquid separator 10, also in perspective view, but cut along an axial vertical plane. FIG. 3 shows the basin and lower main pipe area of a liquid separator 10 according to the invention in intended operation. The figures will be described together below, unless specific reference is made to a particular one of them in an individual case.

The liquid separator 10 comprises a main pipe 100 and a collecting basin 200. In the embodiment shown, the main pipe 100 is formed from upper and lower basically identically shaped half-shells 110, 120 assembled along a horizontal sectional plane with the longitudinal axis aligned horizontally in the operating position.

The collecting basin 200 is formed on the underside of the lower half shell 120. In the embodiment shown, the collecting basin 200 has essentially the shape of a cuboid box with two vertical end walls 201 aligned transverse to the axial direction of the main pipe 100, vertical side walls 202 aligned parallel to the axial direction of the main pipe 100, and a bottom 203. Opposite the bottom 203, the lower half-shell 120 of the main pipe 100 has a window 121 that is closed by a clipped-in insert 300. The insert 300 therefore forms a part of the inner surface of the main pipe 100 and a cover of the collecting basin 200. A vertical partition wall 310 extends from the underside of the insert 300 and is oriented transverse to the axial direction of the main pipe 100. The partition wall 310 extends into the collecting basin 200 and divides the collecting basin 200 into two longitudinal sections that form the first basin chamber 210 and the second basin chamber 220. The partition wall 310 does not extend all the way to the bottom 203 of the collecting basin 200, and therefore there can provide communication between the two basin chambers 210, 220 below the bottom edge of the partition wall 310.

On one side of the partition wall 310, namely in the region of the first basin chamber 210, the insert 300 has slit-shaped passage openings 320 that form a connection between the interior of the main pipe 100 and the first basin chamber 210. On the other side of the partition wall 310, namely in the region of the second basin chamber 220, no such passage openings to the interior of the main pipe 110 are provided.

An outlet 230 is provided in the end wall 210 associated with the second basin chamber 220 and is formed as a simple, horizontal through-hole in the end wall 210 in the illustrated embodiment. The entry and exit openings of the outlet 230 are thus at the same level in the illustrated embodiment. However, embodiments with an outlet formed in the shape of a pipe are also conceivable, in which case the exit opening of the pipe can be lower than its entry opening. The particular significance of the relative positioning of the entry opening of the outlet 230 to the lower edge of the partition wall 310 will be explained in more detail below, especially in the context of FIG. 3.

Above the collecting basin 200, the main pipe 100 has a seat realized via steps in the pipe wall for a filter body 500 that is shown only in FIG. 3. The filter body 500 essentially serves to separate liquid from a liquid-laden gas stream 400 flowing through the main pipe 100 (see FIG. 3).

The operation of the liquid separator 10 is illustrated in FIG. 3. A liquid-laden gas stream 400 flows through the main pipe 100. For example, this may be the water-laden exhaust gas of a fuel cell. Above the collecting basin 200, the gas stream 400 flows through a filter body 500, which is formed, for example, from mineral wool, a knitted wire mesh, or a metal foam or another porous material that is particularly suitable for the respective application. The liquid load of the gas stream 400 is separated at the filter body 500. The gas stream 400 therefore leaves the filter body 500 in a liquid-cleaned form. The separated liquid collects at the bottom of the main pipe 100 and drips through the passage openings 320 into the collecting basin 200, in particular into its first basin chamber 210. Consequently, a liquid sump 600 forms at the bottom of the collecting basin 200, which extends under the lower edge of the partition wall 310 also into the second basin chamber 220. The level of the liquid sump 600 rises until it reaches the entry opening of the outlet 230 and the liquid flows out of the collecting basin 200 through the outlet 230.

As illustrated in FIG. 3, the lower edge of the entry opening of the outlet 230 is positioned higher than the lower edge of the partition wall 310 by a distance symbolized by two arrows, so that when the level of the liquid sump 600 reaches the entry opening of the outlet 230, the partition wall 310 is immersed in the liquid sump 600 so that the first basin chamber 210 is gas-tightly insulated from the second basin chamber 220. Therefore, air-sound that has entered the first basin chamber 210 through the passage openings 320 cannot enter the second basin chamber 220 and pass through it in a direct path to the outlet 230. Rather, as symbolically shown in FIG. 3, the air-sound is reflected off the boundary surfaces of the first basin chamber 210 and overlaps with its own reflections. If the chamber dimensions are designed correctly, this leads to cancellation of the sound waves in certain predetermined frequency bands. Thus, the first basin chamber 210 serves as a resonant chamber of a Helmholtz resonator. It should be noted that the bottom of this resonance chamber is formed by the surface of the liquid sump 600. Assuming a sufficiently large design of the outlet 230, the surface's height is very well defined by the lower edge of the entry opening of the outlet 230 and can therefore be included very well in the dimensional design of the resonance chamber.

Of course, the embodiments discussed in the specific description and shown in the figures are only illustrative examples of embodiments of the present invention. The person skilled in the art is provided with a wide range of possible variations in light of the present disclosure. In particular, the person skilled in the art can adapt the choice of materials used almost arbitrarily to the particular case. For example, liquid separators 10 according to the invention, through which hot exhaust gases flow, for example from an internal combustion engine, are frequently made of metallic materials, whereas liquid separators 10 according to the invention, which are fed with comparatively cold exhaust gases, for example in the context of fuel cells, can be made of plastic.

LIST OF REFERENCE SIGNS 10 liquid separator
100 main pipe
110 upper half shell of 100
120 lower half shell of 100
121 windows in 120
200 collecting basin
201 front wall of 200
202 sidewall of 200
203 bottom from 200
210 1$^{st}$ basin chamber
220 2$^{nd}$ basin chamber
230 outlet
300 insert
310 partition wall
320 passage opening
400 gas flow
500 filter body
600 liquid sump

The invention claimed is:

1. A liquid separator (10), comprising:
a main pipe (100) having a pipe axis oriented horizontally,
a collecting basin (200) having an interior and basin walls (201, 202) arranged sealingly on the underside of the main pipe (100), the collecting basin (200) being divided into first and second basin chambers (210, 220)
a partition wall (310) aligned transverse to the pipe axis of the main pipe (100), the first basing chamber (210) being connected to the interior of the main pipe (100) via passage openings (320), and the second basin chamber (220) having an outlet (230) with an outlet opening, wherein
the partition wall (310) extends sealingly on an underside of the main pipe (100) across a width of the collecting basin (200) and has a connecting opening interconnecting the first and second basin chambers (210, 220) in a fluid-conducting manner, and
the second basin chamber (220) has no direct connection to the interior of the main pipe (100) and the outlet entry opening is located higher than an upper edge of the connection opening.

2. The liquid separator (10) of claim 1, wherein:
the collecting basin (200) has a basin bottom (203) and
the partition wall (310) has a straight, horizontally extending lower edge spaced from the basin bottom (203) of the collecting basin (200).

3. The liquid separator (10) of claim 2, wherein:
the main pipe (100) is of multi-part design in that its pipe wall has a window (121) in a region of the collecting basin (200), the window (121) being closed by an insert (300) has the passage openings (320) and supports the partition wall (310).

4. The liquid separator (10) of claim 3, wherein:
the insert (300) is fixed in the window (121) by a snap-in connection.

5. The liquid separator (10) of claim 3, wherein
the main pipe (100) is composed of an upper half-shell (110) and a lower half-shell (120) that carries the window (121).

6. The liquid separator (10) of claim 1, wherein:
the passage openings (320) are filled with a porous, sound-absorbing material that is permeable to gas and liquid.

7. The liquid separator (10) of claim 3, further comprising:
a porous, sound-absorbing coating inside the collecting basin (200) on at least a part of the underside of the main pipe (100), inner sides of the basin walls (201, 202) and/or the partition wall (310).

8. The liquid separator (10) of claim 3, further comprising:
a porous filter body (500) permeable to gas and liquid filling the main pipe (100) above the passage openings (320).

9. The liquid separator (10) of claim 1, wherein:
the collecting basin (200) is molded integrally to the underside of the main pipe (100).

10. The liquid separator (10) of claim 1, wherein:
the collecting basin (200) is fixed as a separate component to the underside of the main pipe (100).

* * * * *